US011088597B2

(12) United States Patent
De Filippis

(10) Patent No.: US 11,088,597 B2
(45) Date of Patent: Aug. 10, 2021

(54) ELECTRIC MACHINE

(71) Applicant: SPAL AUTOMOTIVE S.R.L., Correggio (IT)

(72) Inventor: Pietro De Filippis, Varazze (IT)

(73) Assignee: SPAL AUTOMOTIVE S.R.L., Correggio (IT)

( * ) Notice: Subject to any disclaimer, the term of this patent is extended or adjusted under 35 U.S.C. 154(b) by 28 days.

(21) Appl. No.: 16/227,035

(22) Filed: Dec. 20, 2018

(65) Prior Publication Data

US 2019/0207483 A1 Jul. 4, 2019

(30) Foreign Application Priority Data

Dec. 28, 2017 (IT) .......................... 102017000150291

(51) Int. Cl.
*H02K 9/22* (2006.01)
*H02K 3/44* (2006.01)
(Continued)

(52) U.S. Cl.
CPC ............... *H02K 9/22* (2013.01); *F28F 21/06* (2013.01); *H02K 1/146* (2013.01); *H02K 1/185* (2013.01); *H02K 15/022* (2013.01); *H02K 15/12* (2013.01)

(58) Field of Classification Search
CPC .......... H02K 1/00; H02K 1/14; H02K 1/146; H02K 1/18; H02K 1/185; H02K 3/00; H02K 3/04; H02K 3/32; H02K 3/325; H02K 3/34; H02K 3/345; H02K 3/52; H02K 3/522; H02K 5/00; H02K 5/08; H02K 5/18; H02K 5/20; H02K 5/22; H02K 5/225; H02K 15/00; H02K 15/02; H02K 15/022; H02K 15/06; H02K 15/08; H02K 15/085; H02K 15/12; H02K 15/16; H02K 9/00; H02K 9/19; H02K 9/22; H02K 5/04; F28F 21/00; F28F 21/06
See application file for complete search history.

(56) References Cited

U.S. PATENT DOCUMENTS

| 4,451,749 | A  | * | 5/1984 | Kanayama | ............. | H02K 21/24 |
|           |    |   |        |          |               | 310/156.37 |
| 7,550,882 | B2 | * | 6/2009 | Verhaegen | ............... | H02K 3/24 |
|           |    |   |        |          |               | 310/58     |

(Continued)

FOREIGN PATENT DOCUMENTS

| DE | 8915212 U1 | 12/1990 |
| EP | 0327338 A2 | 8/1989 |

(Continued)

OTHER PUBLICATIONS

Italian Search Report dated Sep. 19, 2018 for counterpart Italian Patent Application No. 201700150291.

*Primary Examiner* — Tran N Nguyen
(74) *Attorney, Agent, or Firm* — Shuttleworth & Ingersoll, PLC; Timothy J. Klima

(57) ABSTRACT

An electric machine including a casing comprising a base wall, a stator integral with the casing and provided with a plurality of coils constituting a stator winding, a thermally conductive and electrically insulating annular heat sink interposed between the stator and the base wall of the casing; the annular heat sink is abutted against the base wall and the coils are abutted against the annular heat sink which defines a stop for the stator.

13 Claims, 4 Drawing Sheets

(51) Int. Cl.
*F28F 21/06* (2006.01)
*H02K 1/14* (2006.01)
*H02K 1/18* (2006.01)
*H02K 15/02* (2006.01)
*H02K 15/12* (2006.01)

(56) References Cited

U.S. PATENT DOCUMENTS

2010/0019588 A1* 1/2010 Makino .................. H02K 15/12
          310/52
2011/0025147 A1* 2/2011 Owng ...................... H02K 5/18
          310/63

FOREIGN PATENT DOCUMENTS

| EP | 2282395 A2 | | 2/2011 |
|----|------------|---|--------|
| JP | 2008193764 | * | 8/2008 |
| JP | 2016208755 | * | 12/2016 |
| WO | WO2015015461 A2 | | 2/2015 |

* cited by examiner

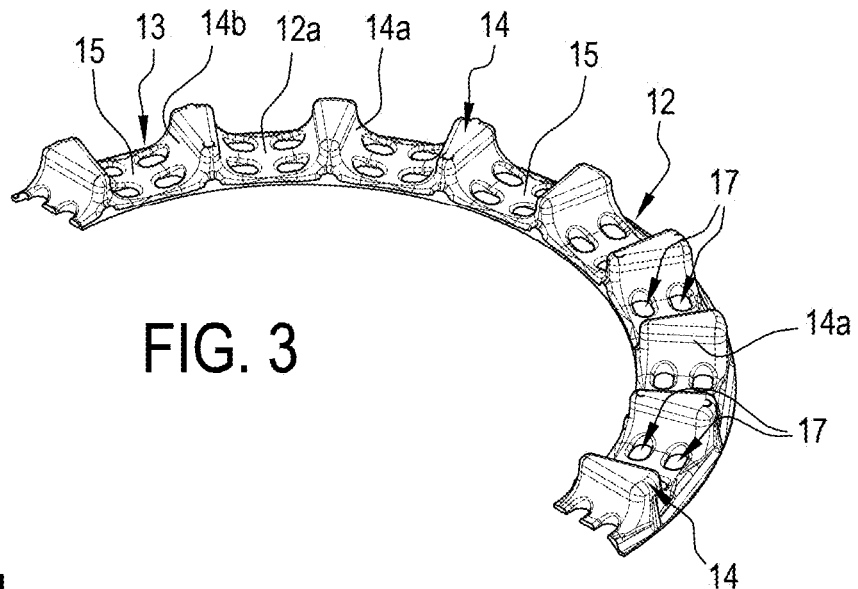
FIG. 3
FIG. 4
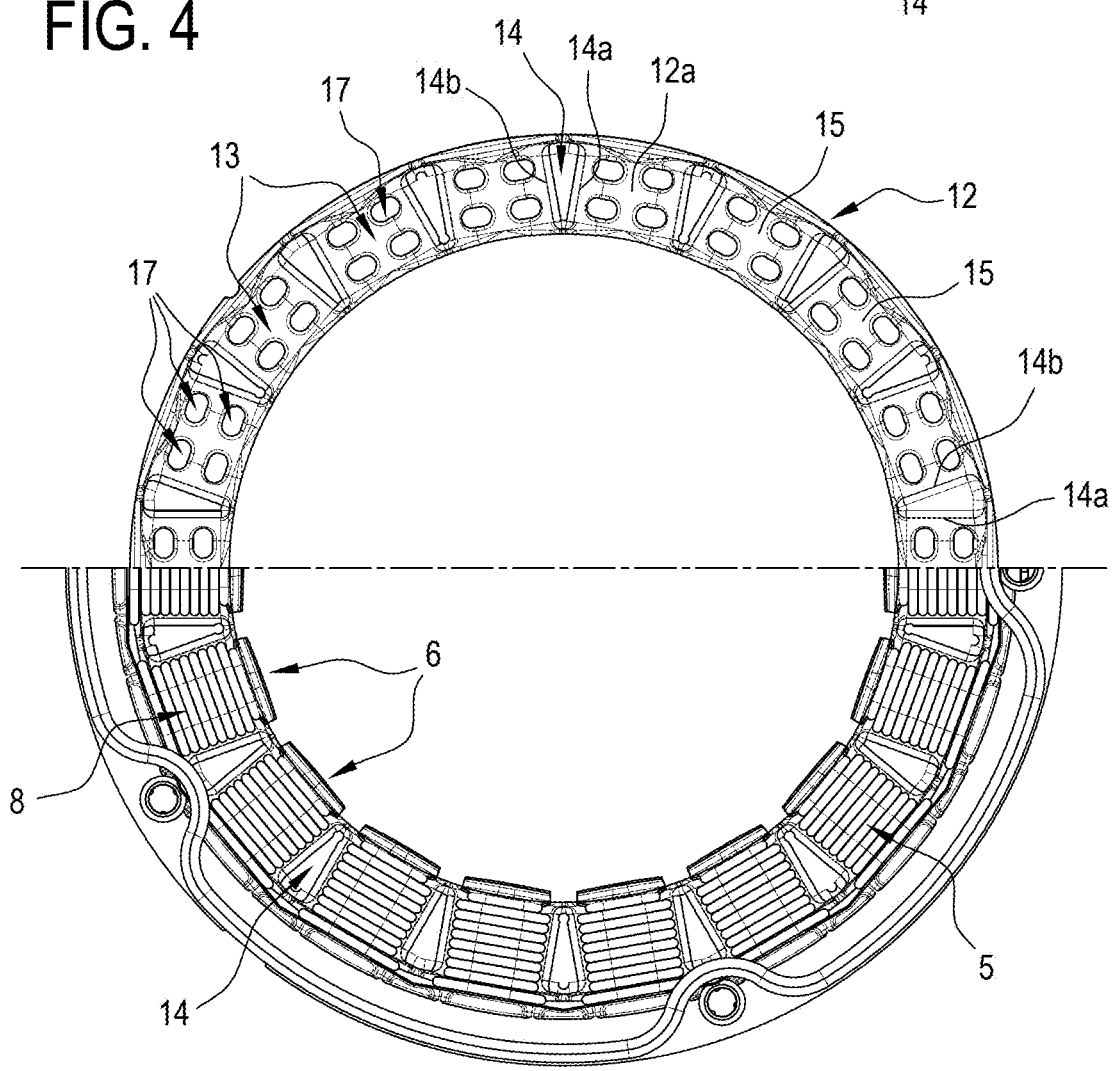

ELECTRIC MACHINE

This application claims priority to Italian Patent Application IT 102017000150291 filed Dec. 28, 2017, the entirety of which is incorporated by reference herein.

BACKGROUND OF THE INVENTION

This disclosure relates to an electric machine and, more specifically, a rotary electric motor, for example used to drive a fan of an electric ventilator.

The disclosure addresses technical field of electric ventilators for automotive applications used to remove heat from radiating bodies and the like.

Generally speaking, a prior art electric motor comprises a casing, housing a wound stator rigidly connected to the casing, and a rotor, for example of the type with permanent magnets, rotatably connected to the casing.

An electronic module or electronic drive module, connected to the stator, is usually mounted in the casing to power the stator.

The casing is closed by a cap to form a sealed container from which connecting pins protrude to allow powering the electronic drive circuitry.

It is known that the windings of an electric machine, be they stator windings or rotor windings, are made up of a plurality of coils of conductive material, generally copper, in the form of lead wire wound round two or more pole pieces of the stator and/or rotor of the electric machine. The winding, which is traversed by electrical current, is insulated from the pole pieces, which are made of ferromagnetic material.

The electrical current flowing through the winding may be high and, on account of the Joule effect, produces heat which propagates to the entire winding and to adjacent parts of the electric machine.

It has been found that the heat deteriorates the conductivity properties of the lead wire, resulting in higher resistance to the flow of current and causing high and often unacceptable energy dissipation.

This situation is particularly serious with rotary electric machines of the sealed type where the windings are enclosed in the container, defined by casing and cap, where cooling air is not free to circulate.

A solution intended to overcome these drawbacks is described in patent document WO2015015461 in the name of the present Applicant.

The casing of the electric machine of that prior document comprises a base wall, transverse to the axis of rotation of the machine and provided with an annular projection projecting towards the inside of the casing.

The stator pack, or ferromagnetic core, is abutted against an annular contact surface extending radially towards the inside of the casing while the windings are in a heat exchanging relationship with the above mentioned annular projection.

The above mentioned prior art motor comprises a layer of electrically insulating and thermally conductive material, interposed between the stator windings and the projection, in order to guarantee that there is adequate electrical insulation and to optimize heat exchange between the stator and the casing.

Another conceptually similar machine, that is to say, one with an abutment member for the ferromagnetic core and a layer of electrically insulating and thermally conductive material interposed between the stator windings and the casing, is disclosed in document DE8915212.

One disadvantage of the layouts of this kind is that when the stator is pressure-fitted into the casing, there is the risk of the insulating layer being damaged, for example by pointed tips in the windings, despite the contact surface for the ferromagnetic core, thus negatively affecting the operation of the motor.

To overcome this drawback, a certain safety clearance must be maintained between the stator and the projection by suitably dimensioning the contact surface and assembly tolerances but thereby worsening the dissipating capabilities of the system. Moreover, especially in the case where the layer of insulating material is divided into separate sheets, each to be placed in the casing at a respective stator coil, assembling the electric machine is relatively complex.

In prior art electric machines of a different kind, described for example in documents EP2282395 or EP0327338, heat dissipation is achieved by filling the gap between the stator and the casing with thermally conductive fillers, such as resins, for example, after the stator has been assembled into the casing and stopped against the corresponding abutment member.

Besides the drawbacks due to assembly tolerances, these solutions also suffer from disadvantages connected with the injection of the fillers and which involve stringent processes to adequately limit dirtying the machine and equipment with the fillers themselves.

SUMMARY OF THE INVENTION

In this context, the main purpose of this disclosure is to overcome the above-mentioned disadvantages.

One aim of this solution is to propose an electric machine with an effective system for cooling the stator winding, hence the entire machine.

Another aim of this solution is to provide a rotary electric machine which is easier to assemble than prior art solutions.

A further aim of this solution is to provide a rotary electric machine which is more robust and dependable than prior art solutions.

The technical purpose and aims specified are substantially achieved by an electric machine according to the present disclosure.

This disclosure relates to a rotary electric machine comprising:
  casing comprising a base wall which is transverse to the axis of rotation of the electric machine;
  cap for closing the casing;
  stator, integral with the casing and provided with a plurality of pole pieces and at least one lead wound around the pole pieces to define a plurality of coils constituting a stator winding.

For simplicity, reference is hereinafter made to an electric motor as an example of a rotary electric machine but without thereby losing in generality.

According to one aspect of the disclosure, the electric machine comprises a thermally conductive and electrically insulating annular heat sink interposed between the stator and the base wall of the casing.

According to one aspect of the disclosure, the heat sink is advantageously abutted against the base wall of the casing and the stator coils are abutted, with an end portion of them, against the annular heat sink.

Advantageously, the heat sink defines an abutment or stop member for the stator after the latter has been inserted into the casing.

That way, it is not necessary to provide other abutment parts on the inside surface of the casing, heat exchange capacity is maximized and assembly tolerances are minimized.

The annular heat sink may be a rigid ring interposed between the stator and the casing in the form of a circular crown.

The stator is abutted against, and stopped by, the annular heat sink, which is made of materials suitable to withstand the thrust by which the stator is inserted into the casing without being damaged.

As already mentioned, the casing need not be provided with a stop for the pack of laminations, since the windings can be pushed against the annular heat sink.

According to one aspect of the disclosure, to maximize the heat exchange surface between the stator and the annular heat sink, the annular heat sink comprises at least one cradle in which at least a first coil of the stator coils is preferably positioned.

According to one aspect of the disclosure, the cradle has a bottom portion, a first flank extending from the bottom portion towards the stator and a second flank, facing the first flank, extending from the bottom portion towards the stator.

The coil is advantageously inserted, at least partly, between the first flank and the second flank, for example with an end portion of it.

The coil can be inserted into the cradle and abutted or rested against the bottom portion of the cradle itself.

According to one aspect of the disclosure, the coil can be abutted or rested against the first flank and/or the second flank of the cradle.

The annular heat sink preferably comprises a plurality of cradles, each for a corresponding stator coil.

According to one aspect of the disclosure, each coil is at least partly positioned in a respective cradle for example with an end portion of it.

The cradles extend one after the other along the annular heat sink preferably uninterruptedly.

In practice, according to one aspect of the disclosure, the annular heat sink has a plurality of teeth extending towards the stator and each tooth separates adjacent cradles.

Each tooth has a first flank, which defines a first flank of a cradle, and a second flank, which defines a second flank of that cradle, adjacent to the previous one, without interruption.

According to one aspect of the disclosure, the annular heat sink is provided with a plurality of through holes, preferably made at least partly in the bottom portion of a cradle or of all the cradles.

According to one aspect of the disclosure, the electric machine comprises a thermally conductive and electrically insulating paste, also known as "gap filler", interposed between the coils and the annular heat sink and/or between the annular heat sink and the casing in such a way as to optimize the heat exchange between the stator windings and the casing of the electric motor.

Advantageously, the possible presence of the above mentioned holes in the heat sink contributes to defining preferential channels for transferring heat, in addition to the heat transferred by the heat sink itself which, as mentioned above, is made of thermally conductive material.

According to one aspect of the disclosure, the base wall of the casing comprises at least one projection projecting towards the inside of the casing in a direction parallel to the axis of rotation of the motor.

The projection may be an annular uninterrupted or broken projection and the annular heat sink is preferably abutted, at least partly, against the projection.

Preferably, the heat sink has a substantially flat face for engaging the projection (or the casing) and the cradles extend from the annular heat sink on the side opposite to the projection.

According to one aspect of the disclosure, the heat sink has a substantially flat face and a face on which the coil cradles are defined. The teeth which delimit the cradles extend from the face on which the cradles themselves are defined.

According to one aspect of the disclosure, the annular heat sink is obtained by moulding a plastic material, reinforced if necessary, having the required properties of electrical insulation, thermal conductivity and compression strength needed to be inserted between the stator and the casing of the motor.

The annular heat sink may be made, for example, of LATICONTHER_80_GR_50 or CoolPoly® E5101 Thermally Conductive Polyphenylene Sulfide (PPS) or thermally conductive PET.

According to one aspect of the disclosure, the annular heat sink may be co-moulded with the casing of the electric motor.

BRIEF DESCRIPTION OF THE DRAWINGS

Other features and advantages of the electric machine according to this disclosure are more apparent in the non-limiting description of a preferred but non-exclusive embodiment of it, as illustrated in the accompanying drawings, in which:

FIG. 3 is a schematic perspective view of a portion of an electric machine according to this disclosure;

FIG. 4 is a plan view from above, with some parts cut away for greater clarity, of an electric machine according to this disclosure;

DESCRIPTION OF THE PREFERRED EMBODIMENTS

Figure 1:
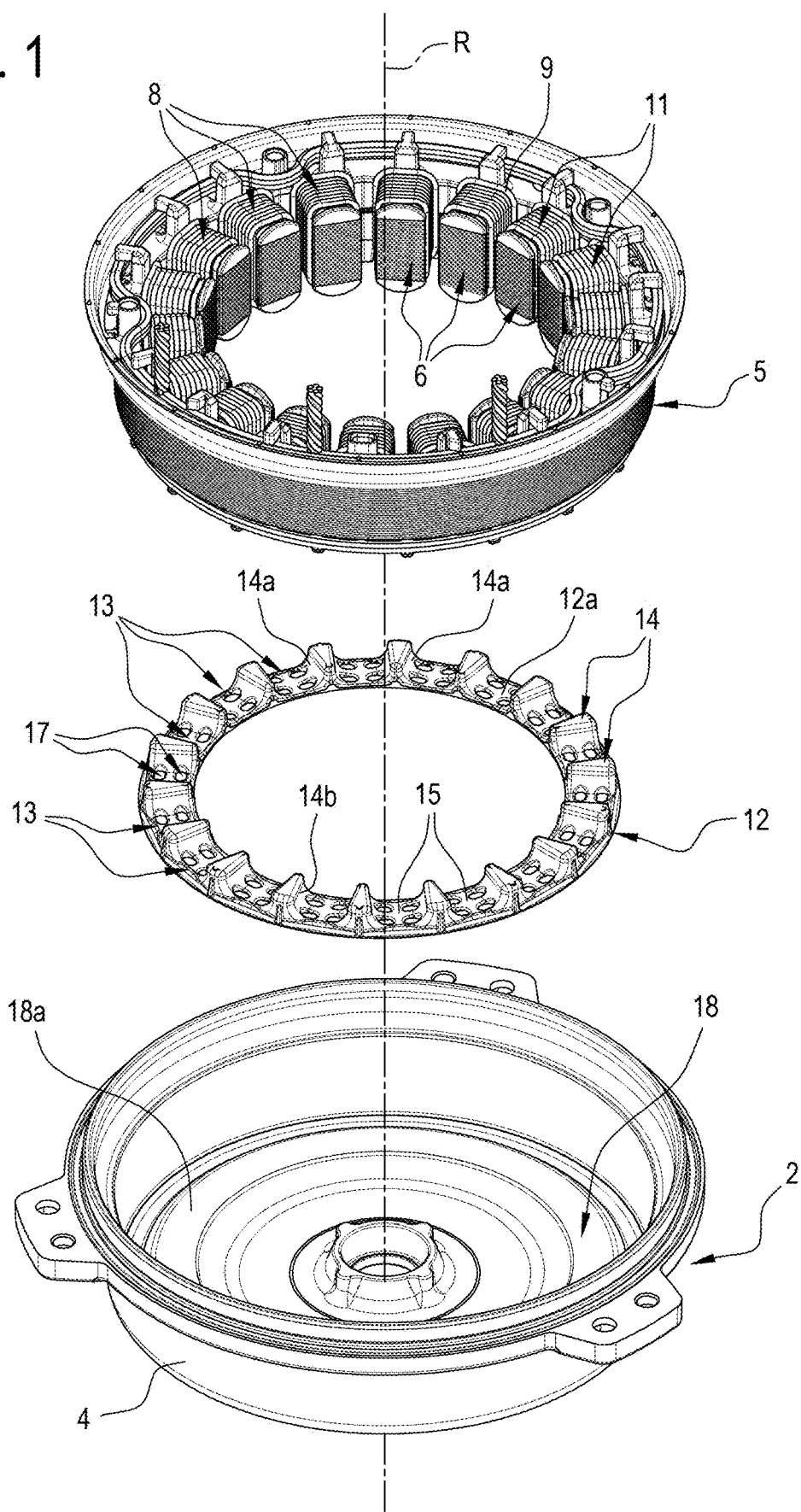
FIG. 1 is a schematic exploded perspective view, with some parts cut away for greater clarity, of an electric machine according to this disclosure.
Figure 2:
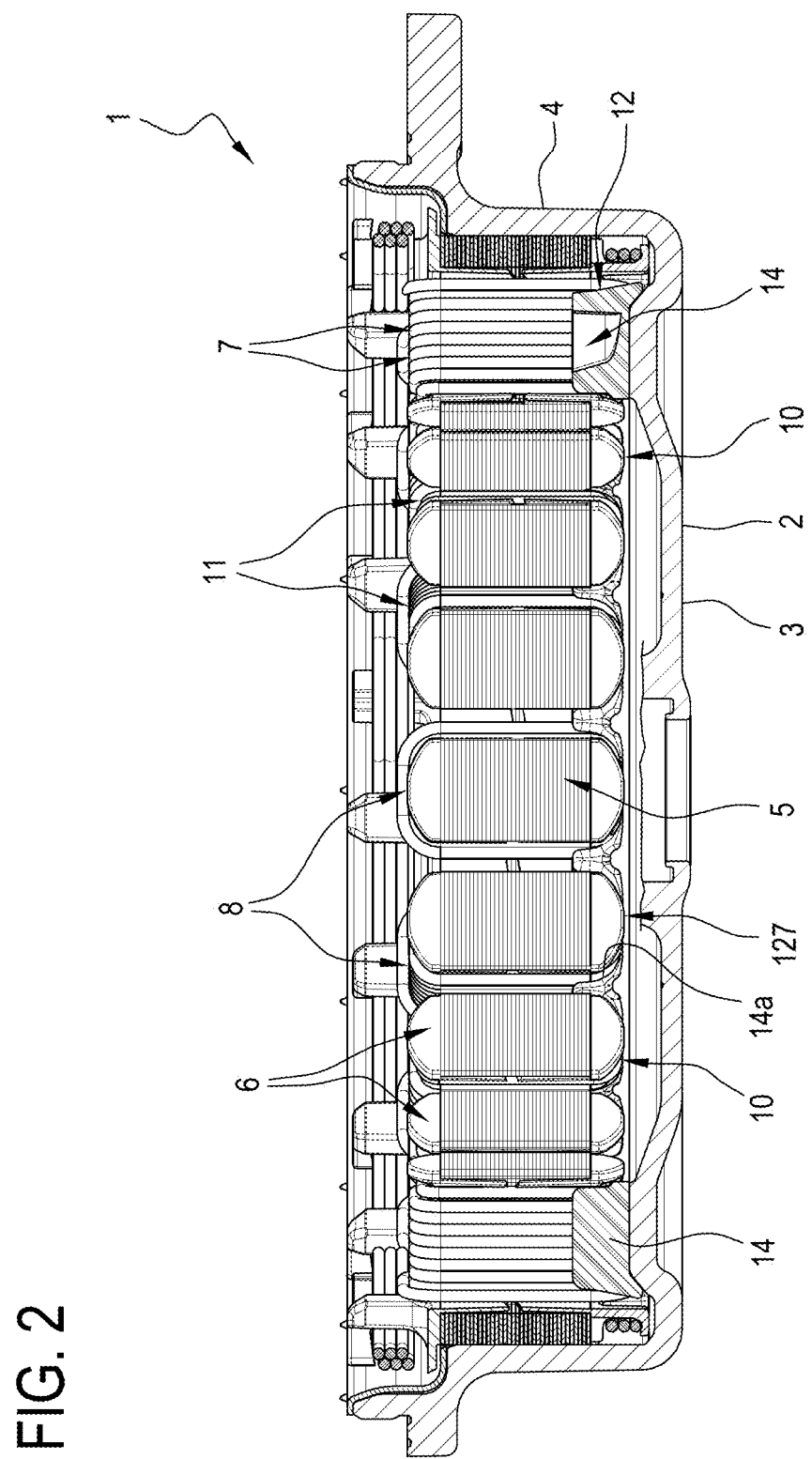
FIG. 2 is a schematic cross section, with some parts cut away for greater clarity, of an electric machine according to this disclosure.

With reference to the accompanying drawings, the numeral 1 denotes a rotary electric machine—for example, a permanent magnet electric motor to which express reference is made without losing in generality.

The machine 1 is illustrated and described hereinafter only insofar as necessary for understanding this disclosure.

The machine 1, having an axis of rotation R, comprises a casing 2 and a cap, not illustrated, for closing the casing 2.

The casing 2 has a base wall 3 transverse to the axis of rotation R and a side wall 4, preferably cylindrical, extending from the wall 3.

The casing 2 and the cap fit together in a direction parallel to the axis of rotation R and form a closed container, preferably of the sealed type.

The motor 1 comprises a stator 5, integral with the casing 2, and a permanent magnet rotor, not illustrated, connected rotatably to the casing 2 and to the cap.

For example, the rotor comprises a shaft having at least one end which protrudes from the container formed by the casing and the cap and to which a fan of an electric ventilator may be fixed, for example.

The stator 5 comprises a plurality of pole pieces 6 and phase leads 7 wound around the pole pieces 6.

The phase leads 7 wound around the pole pieces 6 define a plurality of coils 8 which, in the example illustrated, constitute the stator winding 9.

Each coil 8 has an end portion 10, facing towards the bottom of the casing 2, and an end portion 11 which are aligned with each other in a direction parallel to the axis R.

The machine 1 comprises a thermally conductive and electrically insulating annular heat sink 12 interposed between the stator and the base wall 3 of the casing 2.

The annular heat sink 12 is preferably made by moulding a plastic material such as, for example, LATICONTHER_80_GR_50 or CoolPoly® E5101 Thermally Conductive Polyphenylene Sulfide (PPS) or graphite reinforced PET, which confer the required performance in terms of electrical insulation, thermal conductivity and compression strength because, as explained below, the stator is abutted against the heat sink.

In an alternative embodiment not illustrated, the heat sink 12 is co-moulded with the casing 2.

The heat sink 12 is abutted against the base wall 3 and the coils 8 are abutted against the heat sink 12 on the side opposite the wall 3.

According to this disclosure, the annular heat sink 12 defines an abutment or stop member for the stator 5 when the stator is inserted into the casing 2.

The heat sink 12 is ring shaped and extends round the axis of rotation R of the motor 1.

As illustrated, the heat sink 12 is inserted into the casing 2 coaxially with the stator 5.

The heat sink 12 has a first face 12a directed towards the stator 5 and a second face 12b directed towards the base wall 3.

Preferably, the heat sink 12 has a radial extension substantially corresponding to the radial extension of the coils 8 in such a way that the coils 8 are abutted against the heat sink 12 for their full radial dimension so as to maximize the heat exchange surface between the stator 5 and the heat sink 12.

In an embodiment not illustrated, the heat sink 12 is like an annular crown with substantially flat faces 12a and 12b.

In such a case, the coils are abutted against the face 12a while the face 12b is disposed against the base wall 3.

In the embodiment illustrated, the heat sink 12 comprises a plurality of cradles 13, each for a corresponding coil 8.

Each cradle 13 is delimited by a pair of teeth 14 which extend from the face 12a of the heat sink 12.

The cradles 13 follow each other, preferably uninterruptedly, along the face 12a of the heat sink 12 and each tooth 14 separates two adjacent cradles 13.

In embodiments not illustrated, the heat sink 12 has a plurality of teeth 14 which extend from the face 12a and each pair of teeth 14 encloses two or more coils 8; that is to say, not all the coils 8 have a respective cradle 13 or, in other words, each cradle 13 houses more than one coil 8.

In the preferred embodiment illustrated, each coil 8 is at least partly positioned in a respective cradle 13 with its end portion 10.

Each tooth 14 has a first flank 14a and a second flank 14b.

The first and second flanks 14a, 14b of adjacent teeth 14 delimit a respective cradle 13; the teeth 14 and cradles 13 follow each other, preferably uninterruptedly, along the face 12a of the heat sink 12.

Thus, each cradle 13 is delimited by the flanks 14a and 14b and by a bottom portion 15.

The flanks 14a and 14b extend from the bottom portion 15 towards the stator 5 and each coil 8 is inserted at least partly between the facing flanks 14a and 14b of the respective cradle 13.

In one embodiment, the coils 8 are abutted against the bottom portion 15 of the respective cradle 13.

Preferably, the coils 8, more specifically at least the end portion 10 thereof, are abutted against the flanks 14a, 14b of the respective cradle 13 in such a way as to maximize the heat exchange surface between each coil 8 and the respective cradle 13.

Figure 5:
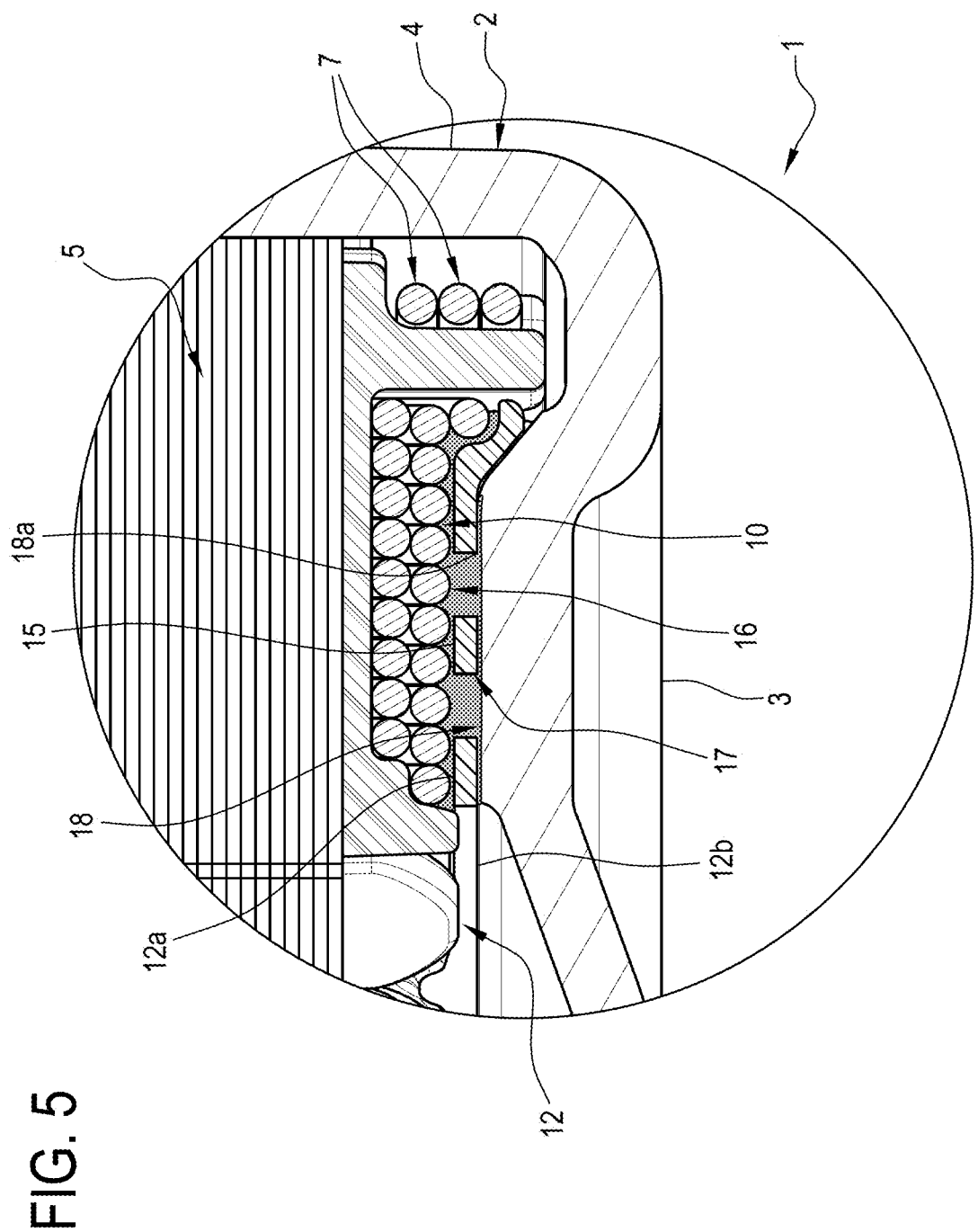
FIG. 5 is a schematic cross section of a detail of an electric machine according to this disclosure.

As illustrated in particular in FIG. 5, the machine 1 comprises a thermally conductive and electrically insulating paste 16, for example a paste of the type known as "gap filler", interposed between the coils 8 and the heat sink 12, so as to fill any empty spaces and optimize heat exchange between the coils 8 and the heat sink 12.

Preferably, the paste 16 is also disposed between the annular heat sink 12 and the casing 2, specifically the base wall 3 thereof, in order to fill any irregularities between the coupling surfaces and to optimize heat exchange between the heat sink 12 and the casing 2.

The heat sink 12 has a plurality of through holes 17 which, in the embodiment illustrated by way of example, are preferably located in the bottom portion 15 of each cradle 13.

The paste 16 is usually also disposed inside the holes 17, thereby defining additional heat exchange channels, through the paste 16, to transfer heat from the stator 5 to the casing 2.

As mentioned, the face 12b of the heat sink 12 is abutted against the base wall 3 of the casing 2, preferably with the paste 16 interposed between the two.

In an embodiment not illustrated, the face of the wall 3 directed towards the inside of the casing 2 is substantially flat and, in practice, the heat sink 12 is abutted against the bottom of the casing 2 and, with its face 12b, is coplanar with the wall 3.

In the embodiment illustrated in particular in FIG. 5, for example, it may be observed that the base wall 3 has a projection 18 projecting towards the inside of the casing 2.

The projection 18 is annular and has a top face 18a in the shape of an annular crown.

In other words, the projection 18 extends away from the positioning plane of the base wall 3 towards a space inside the motor 1.

The heat sink 12 is abutted with its face 12b against the projection 18, specifically against the face 18a and the paste 16 is interposed between the projection 18 and the heat sink 12.

In the embodiment illustrated, the heat sink 12 comprises an annular tooth 19 extending from the face 12b towards the wall 3 for example for centring the heat sink 12 on the projection 18.

That way, the heat flows from the stator 5 to the projection 18, that is, to the casing 2 by way of the heat sink 12; the projection 18 may also be cooled by air circulating inside the motor 1.

A method for assembling an electric machine in any of the embodiments described above comprises positioning or interposing the annular heat sink 12 between the stator 5 and the casing 2 and inserting the stator into the casing.

The stator 5 is pushed into the casing 2 until it compresses the heat sink 12 which, in practice, constitutes an abutment member which stops further insertion of the stator into the casing.

In an embodiment, the heat sink 12 is inserted into the casing 2 until it abuts against the base wall 3 thereof.

The stator 5 is then pushed into the casing 2 until it abuts against the heat sink 12.

In an embodiment, as already mentioned, the heat sink 12 may be co-moulded with the casing 2 inside the base wall 3 thereof.

In an embodiment, the ring or heat sink 12 is coupled to the stator 5 for example by interposing the paste 16 which holds it in place.

The stator 5 and the heat sink 12 are then inserted as one and pushed into the casing 2 until the heat sink 12 abuts against the base wall 3 of the casing, thus defining for the stator 5 the abutment member which stops it from being inserted further.

Advantageously, compared to the solutions with the layer of electrically insulating and thermally conductive material—which require an abutment member made, for example, in the casing so as not to compress the insulating layer—the annular heat sink 12 of the electric machine of this solution is incompressible, in the sense that it is capable, without being damaged, of withstanding the thrust by which the stator 5 is inserted into the casing 2.

The material used is, as mentioned, sufficiently rigid to compression to remain unaffected when the stator is inserted and to constitute an abutment member for the stator when the stator is inserted into the casing.

That way, the stator can be pressed in against the heat sink without necessitating very precise clearances for coupling stator and casing to each other, which are expensive and complicated to obtain.

Assembly of the machine 1 is simplified, there is no longer any need to have special tolerances between stator and casing and to take into account thermal resistance variations due precisely to mechanical tolerances which, in prior art solutions, do not allow the stator and the casing to be effectively coupled thermally to each other.

The cradles maximize the heat exchange surface between the stator winding and the heat sink, especially in combination with the paste 16 since empty spaces, if any, are filled with gap filler.

The heat sink 12 is made as a single ring, preferably of thermally conductive plastic.

In a preferred mode of assembling the machine 1, the ring or heat sink 12 is mounted on the stator 5 and held in place by the paste 16.

The holes 17 allow the paste to pass through and the paste can also be spread on the face 12b when the assembly made up of stator and heat sink is inserted into the casing 2; preferably, a layer of paste 16 is also applied to the heat sink 12 on the side where the casing 2 is.

What is claimed is:

1. An assembly method for assembling an electric machine, comprising the steps of:
    providing an electric machine having an axis of rotation and comprising:
        a casing comprising a base wall transverse to the axis of rotation;
        a stator, integral with the casing and including a plurality of pole pieces and at least one lead wound around the pole pieces to define a plurality of coils constituting a stator winding;
        an annular heat sink that is thermally conductive and electrically insulating;
        the annular heat sink being abutted against the base wall and the coils being abutted against the annular heat sink, the annular heat sink defining a stop or abutment member for the stator against the casing;
        wherein the annular heat sink comprises a cradle for at least a first coil of the coils; the first coil being at least partly positioned in the cradle;
        wherein the cradle, includes a bottom portion, a first flank extending from the bottom portion towards the stator and a second flank, facing the first flank, extending from the bottom portion towards the stator, the first coil being at least partly inserted between the first flank and the second flank;
        wherein the first coil is abutted against the bottom portion of the cradle;
        the annular heat sink being a separate component from the stator, the annular heat sink defining a stop or abutment member for the coils during insertion of the stator into the casing;
    positioning the annular heat sink between the base wall of the casing and the stator prior to insertion of the stator into the casing;
    inserting the stator into the casing until the coils compress the annular heat sink between the stator and the base wall, the annular heat sink defining an abutment or stop member preventing further insertion of the stator into the casing.

2. The assembly method according to claim 1, wherein the first coil is abutted against at least one chosen from the first flank and the second flank of the cradle.

3. The assembly method according to claim 1, wherein the annular heat sink includes a plurality of through holes.

4. The assembly method according to claim 1, wherein the annular heat sink comprises a plurality of cradles, each for a corresponding coil, each coil being at least partly positioned in a respective cradle.

5. The assembly method according to claim 4, wherein the cradles follow each other uninterruptedly along the annular heat sink.

6. The assembly method according to claim 1, comprising a thermally conductive and electrically insulating paste interposed between at least one chosen from the coils and the heat sink and the heat sink and the casing.

7. The assembly method according to claim 1, wherein the base wall comprises a projection projecting towards the inside of the casing in a direction parallel to the axis of rotation, the annular heat sink being abutted at least partly against the projection.

8. The assembly method according to claim 1, wherein the annular heat sink is made of a molded plastic material.

9. The assembly method according to claim 1, wherein the annular heat sink is co-molded with the casing.

10. The assembly method according to claim 1, wherein the step of positioning the annular heat sink between the stator and the base wall of the casing comprises a step of inserting the annular heat sink into the casing before inserting the stator into the casing.

11. The assembly method according to claim 1, wherein the step of positioning the annular heat sink between the stator and the base wall of the casing comprises a step of coupling the annular heat sink to the stator before inserting the stator into the casing.

12. The assembly method according to claim 1, wherein the step of positioning the annular heat sink between the stator and the base wall of the casing comprises a step of co-molding the annular heat sink with the casing.

13. The assembly method according to claim 3, wherein the through holes are positioned at least partly on the bottom portion of the cradle.

\* \* \* \* \*